US007734292B2

(12) United States Patent
Cho et al.

(10) Patent No.: US 7,734,292 B2
(45) Date of Patent: Jun. 8, 2010

(54) TERMINAL SUPPORTING PEER-TO-PEER COMMUNICATION, AND COMMUNICATION AND BILLING METHODS BASED ON THE SAME

(75) Inventors: Sung Rae Cho, Daejeon (KR); Byung Jo Kim, Daejeon (KR); Seong Su Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 342 days.

(21) Appl. No.: 11/518,819

(22) Filed: Sep. 11, 2006

(65) Prior Publication Data

US 2007/0129076 A1  Jun. 7, 2007

(30) Foreign Application Priority Data

Dec. 7, 2005   (KR)   ............... 10-2005-0119078
Jun. 22, 2006  (KR)   ............... 10-2006-0056216

(51) Int. Cl.
  *H04W 36/00*  (2009.01)
(52) U.S. Cl. .................. 455/436; 455/437; 455/440
(58) Field of Classification Search ............ 455/406, 455/436
  See application file for complete search history.

(56) References Cited

U.S. PATENT DOCUMENTS

| 6,385,183 | B1 * | 5/2002 | Takeo ................... 370/335 |
| 6,647,261 | B1 * | 11/2003 | Banerjee ............... 455/436 |
| 6,952,594 | B2 | 10/2005 | Hendin | |
| 2004/0102172 | A1 | 5/2004 | Hendin | |
| 2004/0132488 | A1 | 7/2004 | Hidehiro et al. | |
| 2005/0036469 | A1 | 2/2005 | Wentink | |
| 2005/0128980 | A1 | 6/2005 | Han et al. | |

FOREIGN PATENT DOCUMENTS

| JP | 09-182156 | 7/1997 |
| KR | 1020010035305 A | 5/2001 |
| KR | 1020040044216 | 5/2004 |

(Continued)

OTHER PUBLICATIONS

Ryynänen, Jussi et al., "A Dual-Band RF Front-End for WCDMA and GSM Applications," *IEEE Journal of Solid-State Circuits*, vol. 36, No. 8, Aug. 2001.

*Primary Examiner*—Vincent P Harper
*Assistant Examiner*—Natasha Cosme
(74) *Attorney, Agent, or Firm*—Ladas & Parry LLP (57) ABSTRACT

A terminal supporting peer-to-peer (P2P) communication, wherein a transceiver of the terminal is implemented to support P2P communication with an adjacent terminal in the same cell. Thus, when short-range communication is possible, the terminal performs P2P communication directly with the adjacent terminal, not via a base station. Consequently, when terminals use different mobile telecommunication service providers or there is no base station network, the terminals can be used for short-range communication. More particularly, when a receiving channel state becomes satisfactory while communication with an adjacent terminal is being performed via a base station, the terminal directly switches to a P2P communication mode and performs communication with the adjacent terminal. On the contrary, when the receiving channel state deteriorates while communication with the adjacent terminal is being performed in the P2P communication mode, the terminal directly switches to a base station communication mode and performs communication with the adjacent terminal.

3 Claims, 4 Drawing Sheets

FOREIGN PATENT DOCUMENTS

| | | | |
|---|---|---|---|
| KR | 1020040092766 A | | 11/2004 |
| KR | 1020050119667 | | 12/2005 |
| KR | 1020060028235 | | 3/2006 |
| WO | 01/15387 | * | 3/2001 |
| WO | 2004/008874 | * | 10/2004 |
| WO | 2004/088874 | * | 10/2004 |
| WO | WO2004/088874 | | 10/2004 |
| WO | WO 2004/088874 | | 10/2004 |

* cited by examiner

TERMINAL SUPPORTING PEER-TO-PEER COMMUNICATION, AND COMMUNICATION AND BILLING METHODS BASED ON THE SAME

CROSS-REFERENCE TO RELATED APPLICATION

This application claims priority to and the benefit of Korean Patent Application Nos. 2005-119078, filed Dec. 7, 2005, and 2006-56216, filed Jun. 22, 2006, the disclosures of which are incorporated herein by reference in their entirety.

BACKGROUND

1. Field of the Invention

The present invention relates to a terminal supporting peer-to-peer (P2P) communication, and communication and billing methods based on the same. More particularly, the present invention relates to, in a code division multiple access (CDMA) and asynchronous wideband-CDMA (WCDMA) mobile telecommunication system, a terminal that includes a transceiver implemented to enable P2P communication with an adjacent terminal in the same cell and thus can maximize base station's resources associated with the second generation CDMA service and third generation universal mobile telecommunications system (UMTS) service, a communication method using the terminal, and a billing method based on the terminal.

2. Discussion of Related Art

After the cellular wireless mobile telecommunication system was developed in the U.S.A. toward the end of the nineteen seventies, a voice communication service was provided by an advanced mobile phone service (AMPS), which can be referred to as the first generation (1G) mobile telecommunication system using an analog method, in South Korea. Since then, the second generation (2G) CDMA mobile telecommunication system was developed and commercialized in the mid-nineteen nineties. Most recently, international mobile telecommunication-2000 (IMT-2000), which is the third generation (3G) mobile telecommunication system developed to provide wireless multimedia and high-speed data service, has been commercialized and increasingly used since the end of the nineteen nineties.

In particular, since a WCDMA mobile telecommunication system recommended by 3G IMT-2000 shows excellent speech quality and uses a spread spectrum method, a terminal connected to a base station can request a broadband service in real time by a variable spreading factor (VSF) and multicode. Therefore, the WCDMA mobile telecommunication system is well suited for high-speed data transmission of a high resolution video service, etc.

In the WCDMA system, however, when there are different mobile telecommunication service providers, a terminal must subscribe to an expensive roaming service to operate through a different telecommunication service provider than its own, even though the terminal and an opposite terminal are the same kind of WCDMA terminals. In addition, when there is no base station within a cell radius, a communication service between terminals is not possible.

In order to solve these problems, a method is suggested that includes, in a terminal, a seamless handover function of making a module interoperate with another module for short-range communication in a wireless local area network (WLAN), etc., in a dual mode format, and a small wireless personal area network (WPAN) communication function between close-proximity terminals using Bluetooth or wireless fidelity (WiFi; ad hoc mode). Thereby, the method allows the terminal to perform short-range communication even when communication with a base station is not possible. However, the method requires that the terminal have an additional short-range communication module, thus increasing the cost of the terminal.

SUMMARY OF THE INVENTION

The present invention is directed to a terminal, a communication method using the terminal, and a billing method based on the terminal, in which a transceiver of the terminal is implemented to enable peer-to-peer (P2P) communication with an adjacent terminal in the same cell, performs P2P communication directly with the adjacent terminal (not via a base station) when short-range communication is possible, and thus can be used for short-range communication even when the terminals use different mobile telecommunication service providers or there is no base station network.

One aspect of the present invention provides a terminal supporting P2P communication, comprising: a transmission module for modulating and spreading transmission data, and outputting the transmission data as a transmission signal; a reception module for receiving a downlink signal from a base station or a P2P signal from an adjacent terminal, de-spreading and demodulating the received signal, and outputting it as received data; a receive channel measurer for measuring intensity of the received signal using an averaging process; and a communication mode controller for controlling handover between a base station communication mode and a P2P communication mode according to the intensity of the received signal measured by the receiving channel measurer.

Another aspect of the present invention provides a communication method using a terminal supporting P2P communication, comprising the steps of: (a) performing, by a first terminal and a second terminal adjoining to each other and supporting P2P communication within the radius of the same cell, communication in one of a base station communication mode and a P2P communication mode; (b) periodically measuring, by at least one of the first terminal and the second terminal, intensity of a received signal; and (c) switching, by at least one of the first terminal and the second terminal, to one of the base station communication mode and the P2P communication mode according to the measured intensity of the received signal, and performing communication with a counterpart.

Yet another aspect of the present invention provides a billing method based on a terminal supporting P2P communication, comprising the steps of: performing, by a first terminal and a second terminal adjoining to each other and supporting P2P communication within the radius of the same cell, communication in one of a base station communication mode and a P2P communication mode; when the first terminal and the second terminal communicate with each other in the P2P communication mode, storing communication records of the first and second terminals; when the communication modes of the first and second terminals are switched to the base station communication mode, transmitting the stored communication records to a base station; and performing a billing process in response to the transmitted communication records.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully inform the scope of the present invention to those of ordinary skill in the art.

Figure 1:
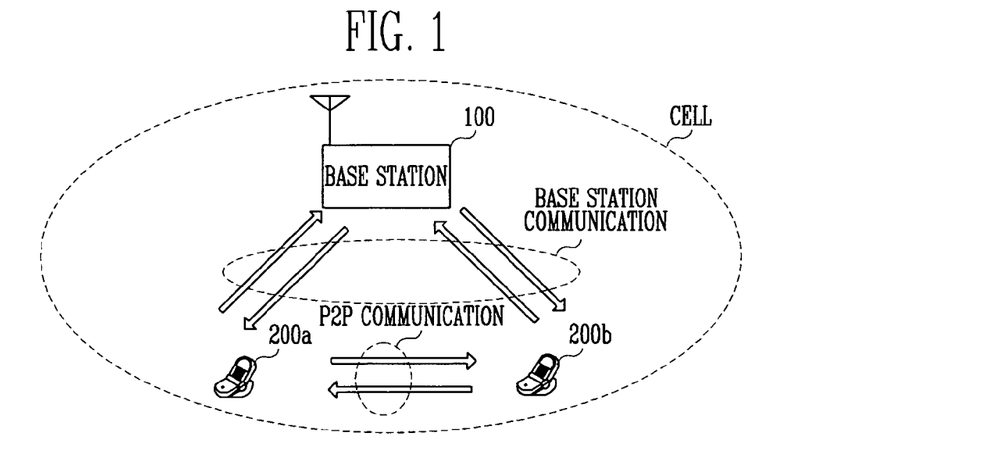
FIG. 1 is a diagram illustrating the concept of peer-to-peer (P2P) communication between terminals according to the present invention.

FIG. 1 is a diagram illustrating the concept of peer-to-peer (P2P) communication between terminals according to the present invention.

Referring to FIG. 1, when a first terminal 200a and a second terminal 200b both supporting P2P communication exist within the radius of the same cell, the first terminal 200a can communicate with the second terminal 200b via a base station 100 or perform P2P communication directly with the second terminal 200b not via the base station 100.

More specifically, when it is determined that P2P communication is needed while the first terminal 200a and the second terminal 200b are communicating with each other via the base station 100, they can switch to a P2P communication mode and perform P2P communication. The construction and operation of the wideband-code division multiple access (WCDMA)/CDMA terminal supporting P2P communication according to the present invention will be described in detail below.

Figure 2:
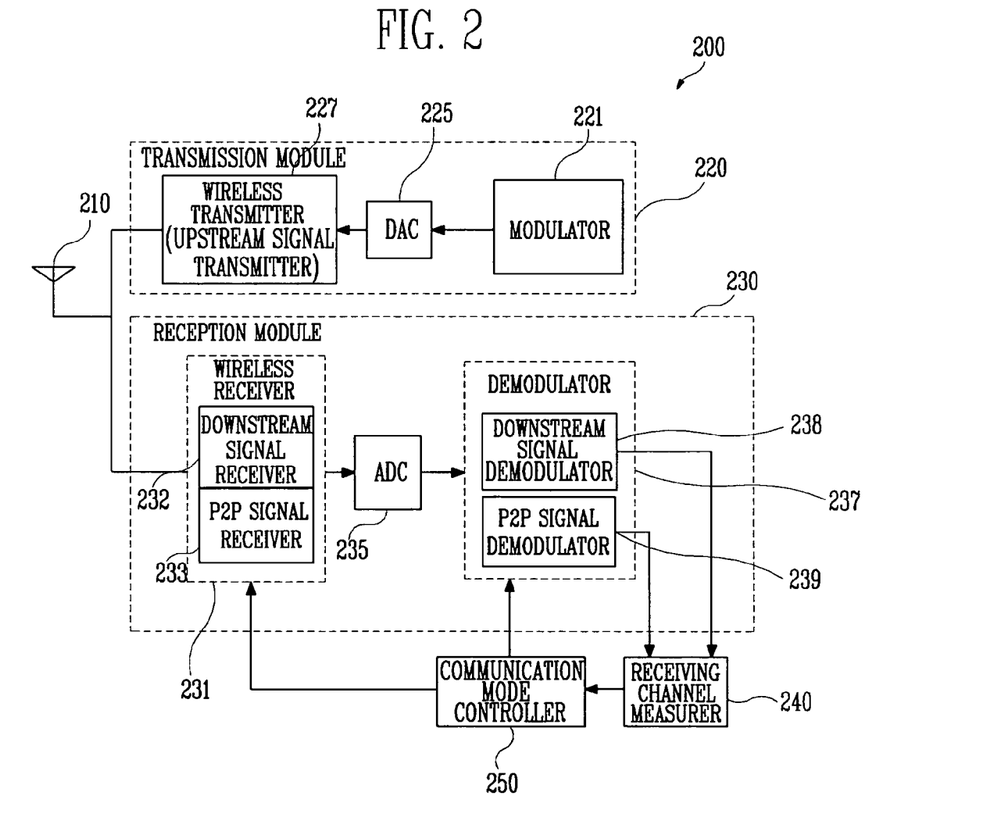
FIG. 2 is a block diagram of a wideband-code division multiple access (WCDMA)/CDMA terminal supporting P2P communication according to a first exemplary embodiment of the present invention.

FIG. 2 is a block diagram of a WCDMA/CDMA terminal supporting P2P communication according to a first exemplary embodiment of the present invention.

Referring to FIG. 2, the WCDMA/CDMA terminal 200 supporting P2P communication according to the first embodiment of the present invention comprises an antenna 210, a transmission module 220, a reception module 230, a receiving channel measurer 240, and a communication mode controller 250.

Here, the antenna 210 may be a broadband antenna.

The transmission module 220 performs modulating and spreading transmission data received from the outside and outputting it as a transmission signal, and the transmission signal generated through the operation is sent to the base station 100 via the antenna 210.

The transmission module 220 includes a modulator 221, a digital-to-analog converter (DAC) 225, and a wireless transmitter 227.

The modulator 221 performs modulating a transport block (TB) transmitted from a media access control (MAC) layer (not shown in the drawing) using, e.g., a CDMA scheme, and outputting it to the DAC 225.

In this embodiment, transport channel (TrCH) coding, physical channel mapping, and spreading and scrambling processes are included in the modulation process.

The DAC 225 converts the digital transmission data input from the modulator 221 into analog transmission data, and outputs it to the wireless transmitter 227.

The wireless transmitter 227 performs a wireless process on the output signal of the DAC 225 and outputs a transmission signal. In this embodiment, the wireless transmitter 227 may be considered as an uplink signal transmitter that transmits an uplink signal to the base station.

The transmission signal output from the wireless transmitter 227 is output to the antenna 210 via a transmission/received signal separator (not shown in the drawing).

Meanwhile, the reception module 230 performs operations of de-spreading and demodulating a received signal input from the outside and outputting it as received data.

The reception module 230 includes a wireless receiver 231, an analog-to-digital converter (ADC) 235, and a demodulator 237.

The wireless receiver 231 performs a wireless process on a received signal input through the antenna 210 and the transmission/reception signal separator (not shown in the drawing). Here, a downlink signal from the base station 100 is received by a downlink signal receiver 232, and a P2P signal from an adjacent terminal is received by a P2P signal receiver 233.

In other words, the wireless receiver 231 of the present invention includes the P2P signal receiver 233 for P2P communication with an adjacent terminal in addition to the downlink signal receiver 232 for communication with a base station.

Here, the P2P signal receiver 233 may be implemented with a simpler structure than the downlink signal receiver 232. For example, the P2P signal receiver may be implemented by combining a mixer that can receive a signal of the same frequency band from an adjacent terminal without a low-noise amplifier (LNA) and uses one phase-locked loop (PLL) and a low-pass filter.

The ADC 235 converts an analog signal received through the wireless receiver 231 into a digital signal, and transfers it to the demodulator 237.

The demodulator 237 performs an operation of demodulating the digital signal received from the ADC 235 and outputting the demodulated received data to the receiving channel measurer 240. Here, a downlink signal from the base station 100 is demodulated by a downlink signal demodulator 238, and a P2P signal from an adjacent terminal is demodulated by a P2P signal demodulator 239.

In other words, the demodulator 237 of the present invention includes the P2P signal demodulator 239 for demodulating the P2P signal received from the adjacent terminal in addition to the downlink signal demodulator 238 for demodulating the downlink signal received from the base station 100.

In this embodiment, processes of transport channel (TrCH) decoding, physical channel de-mapping, and de-spreading and descrambling are included in the demodulation process.

Here, the P2P signal demodulator 239 may be implemented with a simpler structure than the downlink signal demodulator 238. For example, the P2P signal demodulator may be implemented with a structure of a simple rake receiver with a single finger capable of performing only a demodulation process for a dedicated physical channel of the counterpart terminal without consideration of multipath diversity.

Meanwhile, the signal demodulated by the downlink signal demodulator 238 or the P2P signal demodulator 239 is input to the receiving channel measurer 240, which measures signal intensity of a receiving channel and outputs the measured value to the communication mode controller 250 in response to the signal input.

In this embodiment, intensity of a received signal may be measured by a method of measuring energy in units of a symbol (bit) of the received signal and averaging them over slots. The method of recognizing a channel state of a received signal using the averaging process is widely used in the corresponding field, and thus a detailed description thereof will be omitted.

The communication mode controller 250 controls handover between the base station communication mode and the P2P communication mode according to the signal intensity of the receiving channel measured by the receiving channel measurer 240.

More specifically, the communication mode controller 250 determines whether or not the measured signal intensity of the receiving channel is equal to or more than a predetermined threshold value. When the measured signal intensity is the threshold value or more, the communication mode controller 250 determines that a receiving channel state is satisfactory, switches to the P2P communication mode, and controls the terminal 200 to perform P2P communication with the counterpart. On the contrary, when the measured signal intensity is less than the predetermined threshold value, the communication mode controller 250 determines that the receiving channel state has deteriorated, switches to the base station communication mode, and controls the terminal 200 to communicate with the counterpart via the base station 100.

Here, the predetermined threshold value is preferably set to a signal intensity value with which the base station communication mode and the P2P communication mode can be distinguished.

When the communication mode controller 250 determines that P2P communication is needed during communication with the counterpart in the base station communication mode, the terminal 200 according to the present invention switches to the P2P communication mode and performs P2P communication with the counterpart. On the contrary, when the communication mode controller 250 determines that it is necessary to switch to base station communication during communication with the counterpart in the P2P communication mode, the terminal 200 switches to the base station communication mode and performs communication with the counterpart via the base station 100.

According to the present invention, by implementing a transceiver of a terminal to perform P2P communication between adjacent terminals in the same cell, a terminal can perform P2P communication directly with another terminal, not via a base station, when short-range communication is available. The P2P communication function according to the present invention will be described in detail below.

Figure 3:
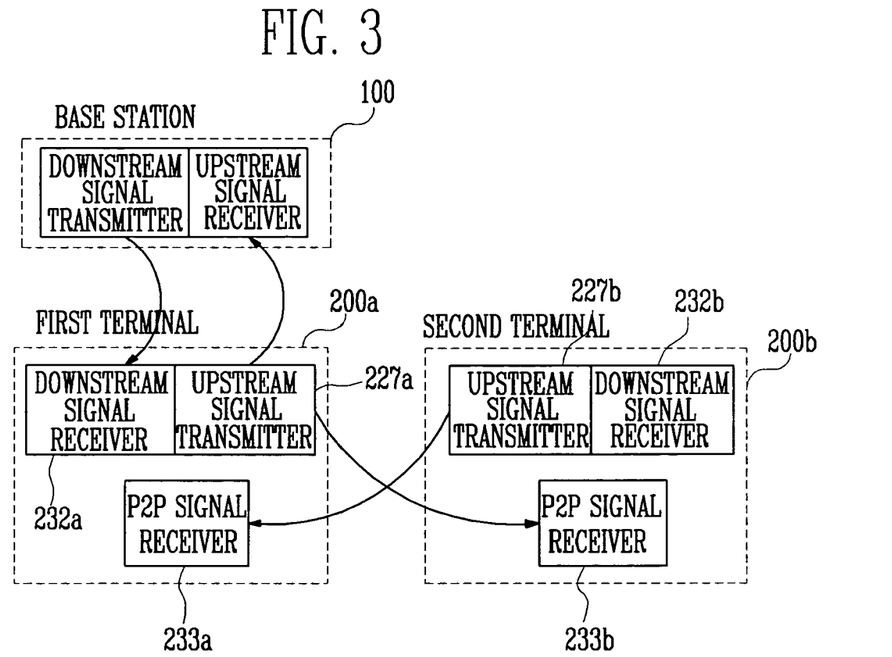
FIG. 3 is a block diagram illustrating operation of the WCDMA/CDMA terminal supporting P2P communication according to the first exemplary embodiment of the present invention.

FIG. 3 is a block diagram illustrating operation of the WCDMA/CDMA terminal supporting P2P communication according to the first exemplary embodiment of the present invention.

Referring to FIG. 3, in the base station communication mode, an uplink signal transmitter (wireless transmitter) 227a of the first terminal 200a sends an uplink wireless signal to a base station 100, and a downlink signal receiver 232a of the first terminal 200a receives a downlink wireless signal from the base station 100.

Likewise, in the base station communication mode, an uplink signal transmitter (wireless transmitter) 227b of the second terminal 200b sends an uplink wireless signal to the base station 100, and a downlink signal receiver 232b of the second terminal 200b receives a downlink wireless signal from the base station 100.

Meanwhile, when the first terminal 200a switches from the base station communication mode to the P2P communication mode, the first terminal 200a and the second terminal 200b perform P2P communication without the base station 100. Hereupon, when the uplink signal transmitter 227a of the first terminal 200a transmits an uplink wireless signal, the signal is received by a P2P signal receiver 233b. And, when the uplink signal transmitter 227b of the second terminal 200b transmits an uplink wireless signal, the signal is received by a P2P signal receiver 233a of the first terminal 200a.

Here, the first terminal 200a and the second terminal 200b preferably perform P2P communication using a scrambling code that is assigned to distinguish each terminal.

More specifically, the first terminal 200a performs scrambling and spreading processes using a channelization code/scrambling code in a modulation process of transmission data. When a wireless signal having passed through the scrambling and spreading processes is transmitted to the second terminal 200b, the second terminal 200b performs descrambling and de-spreading processes using the channelization code/scrambling code applied to the first terminal 200a, thereby demodulating the received data.

The channelization code is assigned by the base station 100 in order to distinguish a physical channel using an orthogonal property. In addition, using a correlation property, the scrambling code is used for the base station to distinguish a terminal in case of a downlink signal and to distinguish a base station in case of an uplink signal.

Thus far, the operation of a terminal that uses the same uplink frequency band for transmission and reception and performs half-duplex P2P communication according to a time division duplex (TDD) method has been described as an example. However, a terminal according to the present invention can perform full-duplex P2P communication also. A terminal supporting full-duplex P2P communication will be described in detail below with reference to FIG. 4.

Figure 4:
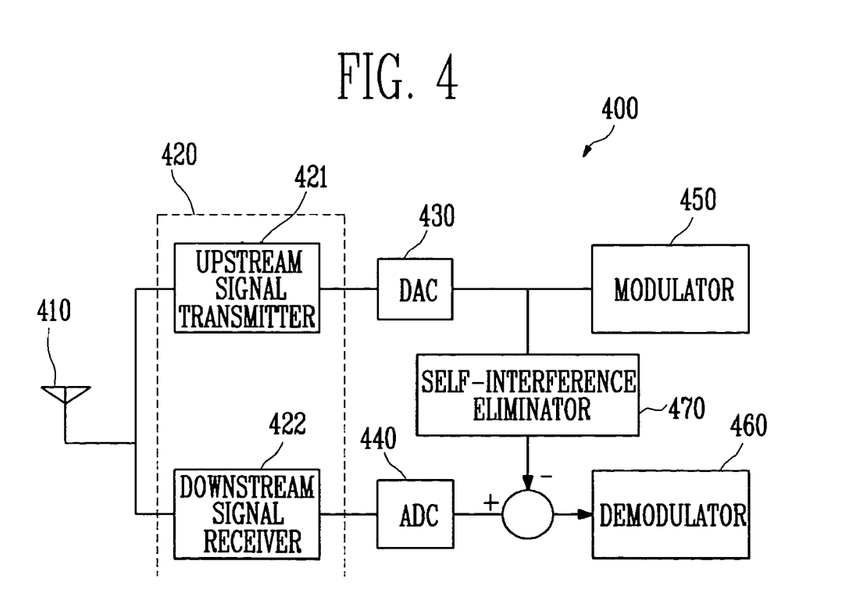
FIG. 4 is a block diagram of a WCDMA/CDMA terminal supporting P2P communication according to a second exemplary embodiment of the present invention.

FIG. 4 is a block diagram of a WCDMA/CDMA terminal supporting P2P communication according to a second exemplary embodiment of the present invention.

Referring to FIG. 4, the terminal 400 according to the second embodiment of the present invention comprises an antenna 410, a transceiver module 420, a DAC 430, an ADC 440, a modulator 450, a demodulator 460, and a self-interference eliminator 470.

Except for the transceiver module 420 in which a transmission module and reception module are combined, and the additional self-interference eliminator 470, the terminal 400 has the same structure as the terminal 200 shown in FIG. 2. Thus, a detailed description of components already described above will not be repeated here.

When a wireless signal is received by the transceiver module 420 through the antenna 410 of the terminal 400, a downlink signal receiver 422 of the transceiver module 420 processes the input wireless signal and transfers it to the ADC 440. Then, the signal input to the ADC 440 is converted into a digital signal and input to the demodulator 460.

Meanwhile, besides the received signal converted into the digital signal by the ADC 440, a transmission signal modulated by the modulator 450 or echoed back from the antenna 410 may be input to the demodulator 460. In this case, the transmission signal may interfere with the received signal and generate an error during demodulation of the received signal.

More specifically, during P2P communication, a transmitting terminal and receiving terminal use different scrambling codes to suppress the influence of interference as much as possible. However, since the transmitting terminal and receiving terminal transmit and receive signals using the same uplink frequency band, mutual interference between a transmission signal and a received signal may occur.

In order to solve this problem, the self-interference eliminator 470 filters the transmission signal modulated by the modulator 450 or echoed back from the antenna 410, thus eliminating interference influence of the transmission signal from the received signal input to the demodulator 460.

In this embodiment, the self-interference eliminator 470 may be implemented with a structure similar to multiple user detection (MUD) generally used by the base station 100 for interference suppression, and may be preferably implemented by a feed-through type elimination filter capable of adjusting a coefficient value.

Therefore, by eliminating the influence of mutual interference between the transmission signal and received signal as described above, the transmitting terminal and receiving terminal can smoothly perform full-duplex P2P communication.

As described above, when a receiving channel state becomes satisfactory while communication with an adjacent terminal is being performed via a base station, the terminal supporting P2P communication according to the present invention switches to the P2P communication mode and performs communication with the adjacent terminal. On the contrary, when the receiving channel state deteriorates while communication with an adjacent terminal is being performed in the P2P communication mode, the terminal switches to the base station communication mode and performs communication with the adjacent terminal.

Communication methods using a terminal supporting P2P communication according to the present invention will be described in detail below with reference to the appended drawings.

Figure 5:
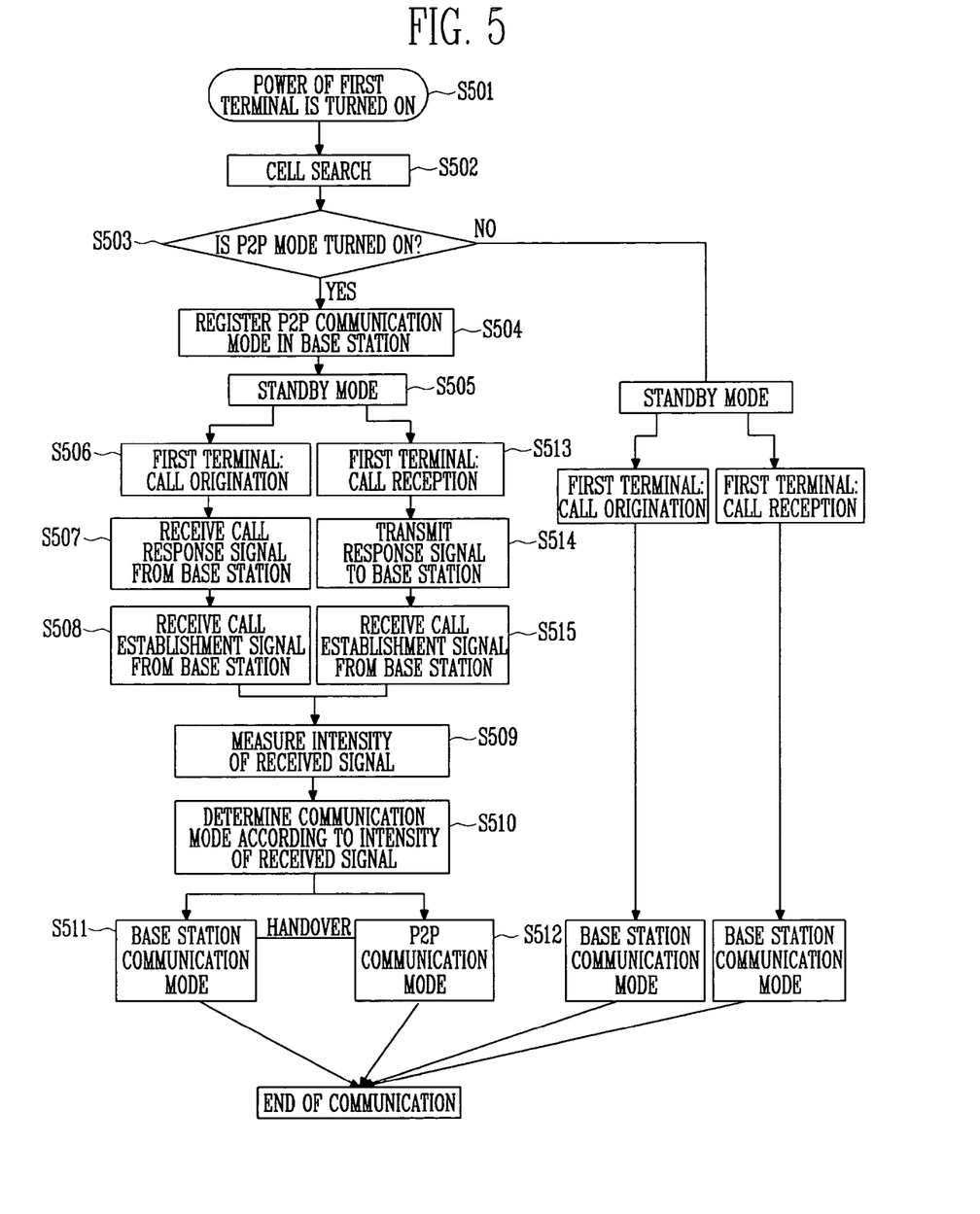
FIG. 5 is a flowchart showing a first communication method using a terminal supporting P2P communication according to the present invention.

FIG. 5 is a flowchart showing a first communication method using a terminal supporting P2P communication according to the present invention.

For convenience, it is assumed in the following description that a first terminal and a second terminal are adjacent to each other within the radius of the same cell.

Referring to FIG. 5, when the power of the first terminal is turned on in step 501, the first terminal performs a cell search process to search for a cell in which the first terminal is located in step 502, and then checks whether or not the P2P communication mode is on in step 503.

When the P2P communication mode is on, the first terminal registers the P2P communication mode in a base station 100 in step 504, and then enters a standby mode in step 505.

Subsequently, when a call is originated from the first terminal and an originating call signal according to the call origination is transmitted to the base station in step 506, the base station transmits a call response signal to the first terminal.

Here, the call response signal transmitted to the first terminal preferably includes information on a channelization code/scrambling code of the first terminal.

When receiving the call response signal from the base station in step 507, the first terminal stores the channelization code/scrambling code information included in the call response signal.

Subsequently, when the base station tries and succeeds in establishing a call to the counterpart, i.e., the second terminal, it transmits a call establishment signal to the first terminal.

Here, the P2P communication mode has been turned on in the second terminal, and the P2P communication mode of the second terminal has been registered in the base station 100.

When the call establishment signal is received from the base station in step 508, the first terminal measures intensity of the received signal using a pilot signal of the received signal in step 509. The method of measuring intensity of a signal using a pilot signal is widely used in the related technical field, and thus a detailed description thereof will be omitted.

Subsequently, in step 510, the first terminal determines whether to perform communication in the base station communication mode or the P2P communication mode according to the measured intensity of the received signal.

More specifically, the first terminal determines whether or not the measured intensity of the received signal is a predetermined threshold value or more. When the measured intensity is the predetermined threshold value or more, the first terminal determines that a receiving channel state is satisfactory and to perform communication with the second terminal in the P2P communication mode. On the contrary, when the measured intensity is less than the predetermined threshold value, the first terminal determines that the receiving channel state has deteriorated and to perform communication with the second terminal in the base station communication mode.

Subsequently, according to the communication mode determined in step 510 of determining a communication mode, the first terminal communicates with the second terminal in the base station communication mode in step 511 or the P2P communication mode in step 512.

Meanwhile, the first terminal measures the intensity of a received signal periodically during communication in the base station communication mode. When it is determined that P2P communication is needed according to the measured intensity of the received signal, the first terminal switches to the P2P communication mode and performs P2P communication with the second terminal.

In the same manner, the first terminal measures the intensity of a received signal periodically during communication in the P2P communication mode. When it is determined that it is necessary to switch to the base station communication mode according to the measured intensity of the received signal, the first terminal switches to the base station communication mode and communicates with the second terminal via the base station 100.

In other words, the first terminal performs handover between the base station communication mode and P2P communication mode, thereby performing communication with the second terminal. In the same manner, the second terminal performs communication with the first terminal.

Meanwhile, when the first and second terminals communicate with each other in the P2P communication mode not via the base station, the base station cannot obtain communication records between the first terminal and the second terminal. In order to solve this problem, preferably, the first terminal and the second terminal each store communication records during communication in the P2P communication mode and send the stored communication records to the base station upon switching to the base station communication mode, thereby enabling electronic billing for the P2P communication service.

Meanwhile, in the standby mode of step 505, when a call is originated from the second terminal and an originating call signal according to the call origination is transmitted to the first terminal via the base station, i.e., when the destination signal is received by the first terminal via the base station in step 513, the first terminal transmits a response signal to the base station in response to reception of the destination signal in step 514.

Here, the response signal transmitted from the first terminal to the base station may preferably include information on a channelization code/scrambling code of the first terminal.

When a call establishment signal is received by the first terminal from the base station in step 515, the first terminal measures the intensity of the received signal in step 509, determines whether to perform communication in the base station communication mode or the P2P communication mode according to the measured intensity of the received signal in step 510, and performs communication with the second terminal according to the determined communication mode in step 511 or 512. Since the method of measuring the intensity of the received signal and determining the communication mode according to the measured intensity goes through the same process described above, a detailed description thereof will be omitted.

Although a case in which the first terminal measures the intensity of a received signal and determines one of the base station communication mode and the P2P communication mode according to the measured intensity of the received signal is described above as an example, the communication mode determination can be made by the first terminal, the second terminal, or both.

In this embodiment, it is preferable to switch to the base station mode when the P2P communication mode is not available for one of the first terminal and the second terminal. Also, it is preferable to frequently attempt switching the communication mode.

As described above, the first terminal and the second terminal periodically recognize a receiving channel state of a received signal while performing communication, and switch to the base station communication mode or P2P communication mode according to the receiving channel state. Therefore, when short-range communication is available, the first terminal and the second terminal can communicate directly in the P2P communication mode without going through the base station, and thus can be used for short-range communication.

Although a case in which a terminal switches to the P2P communication mode during communication in the base station communication mode or vice versa when a base station is searched in a cell search process is described as an example, the first terminal and the second terminal communicate directly in the P2P communication mode when cell searching fails to detect a base station. This will be described in detail below with reference to FIG. 6.

Figure 6:
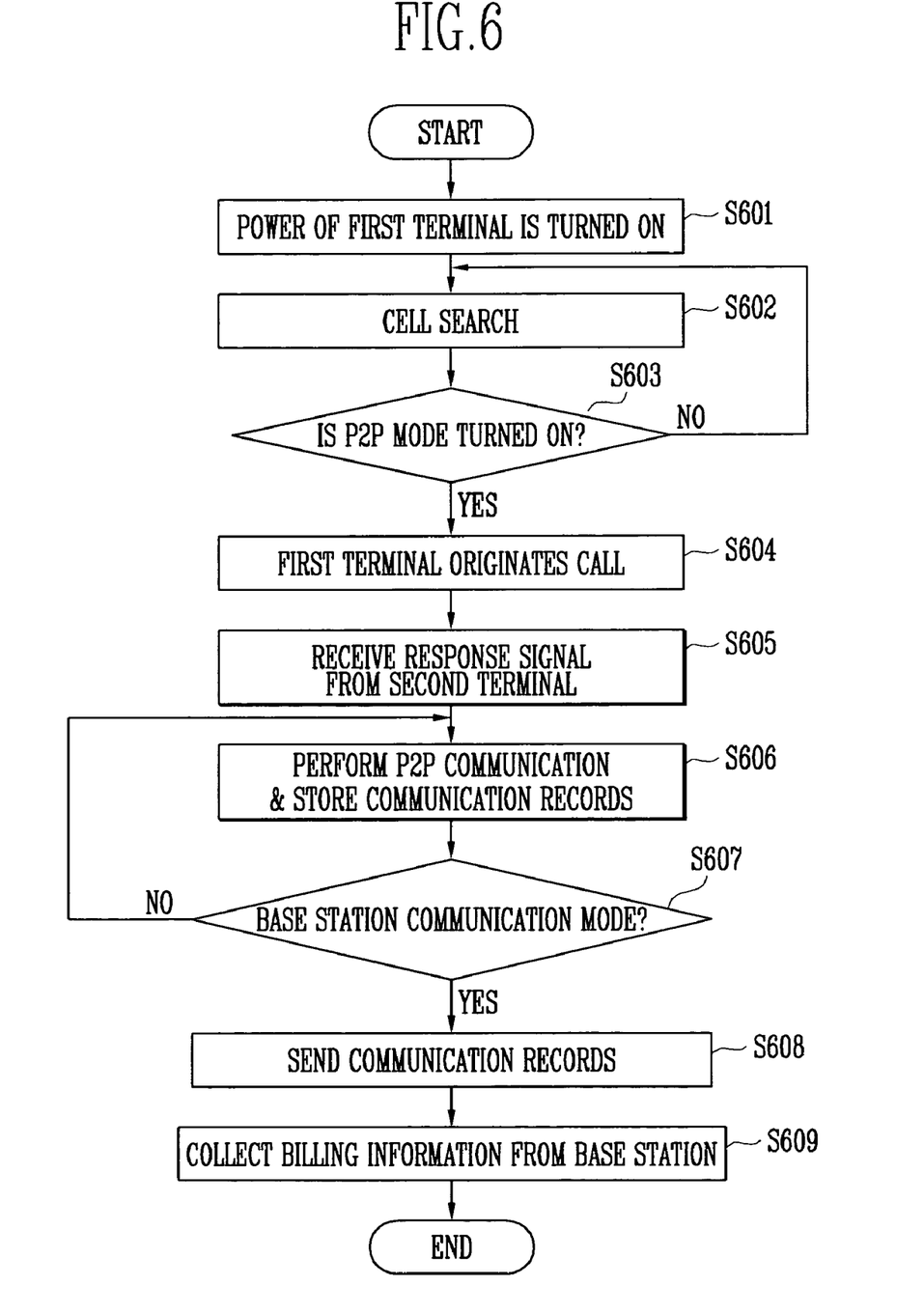
FIG. 6 is a flowchart showing a second communication method using a terminal supporting P2P communication according to the present invention.

FIG. 6 is a flowchart showing a second communication method using a terminal supporting P2P communication according to the present invention.

For convenience, it is assumed in the following description that there is no base station within a cell radius, a first terminal is adjacent to a second terminal, and the first terminal and the second terminal communicate in a half-duplex P2P communication mode.

Referring to FIG. 6, when the power of the first terminal is turned on in step 601, the first terminal performs a cell search process to search for a cell in which the first terminal is located in step 602. When it is determined that there is no base station, the first terminal checks whether or not the P2P communication mode is on in step 603.

When a call is originated from the first terminal in step 604 while the P2P communication mode of the first terminal is on, an originating call signal according to the call origination is received by the second terminal.

Subsequently, when the second terminal responds to the originating call signal, a response signal according to the response is received by the first terminal in step 605.

In this manner, the first terminal and the second terminal perform P2P communication. Here, records of communication with the counterpart during P2P communication are stored in a memory (not shown in the drawings) in step 606.

Subsequently, in step 607, the first terminal and the second terminal periodically obtain base station information by cell search, and determine whether or not it is possible to perform communication in the base station communication mode. The reason why the first terminal and the second terminal obtain base station information by periodic cell search in this manner is that it is also possible to switch to the base station mode due to mobility of the first terminal and the second terminal.

When it is determined that communication is possible in the base station communication mode, the first terminal and the second terminal each send the communication records stored in their memories to the corresponding base station(s) in step 608, thereby enabling electronic billing for the P2P communication service. Subsequently, in step 609, billing information is collected from the base station(s) according to a general billing process.

More specifically, when the first terminal and the second terminal communicate with each other in the P2P communication mode, the base station(s) cannot obtain records of communication between the first terminal and the second terminal. Thus, in the present invention, the first terminal and the second terminal each store communication records in the P2P communication mode and send the stored communication records to the base station(s) when they switch to the base station communication mode, thereby enabling electronic billing for the P2P communication service.

Meanwhile, even when communicating with each other in the P2P communication mode as described above, the first terminal and the second terminal preferably reduce transmission and reception power consumption using a closed-loop power control scheme that properly controls power according to distance from the counterpart terminal, state of currently-received radio waves, and self-movement.

The above-described embodiments of the present invention can be written as computer programs, stored on computer-readable media, and implemented in general purpose digital computers.

As described above, according to the present invention a transceiver of a terminal is implemented to support P2P communication between adjacent terminals in a cell. When short-range communication is possible, the terminal performs P2P communication directly with a counterpart terminal, not via a base station. Thus, when the terminals use different mobile telecommunication service providers or there is no base station network, they can be used for short-range communication. Consequently, wireless resources of a base station can be conserved and performance of the entire system can be improved.

In addition, according to the present invention, since a terminal supporting P2P communication can be fabricated without an additional short-range communication module, the cost of manufacturing the terminal can be reduced.

In addition, according to the present invention, the influence of interference between a transmission signal and received signal can be reduced in comparison with a conventional terminal, and unnecessary power consumption can be prevented by controlling power using the closed-loop power control scheme even in the P2P communication mode.

In addition, a transmitting terminal and receiving terminal each store communication records in the P2P communication mode, and when switching to the base station communication mode, transmit the stored communication records to a base station, thereby enabling electronic billing for the P2P communication service. Consequently, billing can be performed more reasonably.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A terminal supporting peer-to-peer (P2P) communication, comprising:
    a transmission module for modulating and spreading transmission data, and outputting the transmission data as a transmission signal;
    a reception module for receiving a downlink signal from a base station or a P2P signal from an adjacent terminal, de-spreading and demodulating the received signal, and outputting it as received data;
    a receive channel measurer for measuring intensity of the received signal using an averaging process; and
    a communication mode controller for controlling handover between the base station communication mode and a P2P communication mode according to the intensity of the received signal measured by the receiving channel measurer,
    wherein the terminal automatically performs the handover to the P2P communication mode according to the intensity of the received signal measured by the receiving channel measurer without the base station having knowledge of the terminal performing P2P communication when the terminal is in the P2P communication mode,
    wherein the communication mode controller controls the terminal to perform P2P communication with the adjacent terminal when the intensity of the received signal measured by the receiving channel measurer exceeds a threshold value, and to communicate with the adjacent terminal via the base station in the base station communication mode when the intensity of the received signal measured by the receiving channel measurer is less than the threshold value.

2. The terminal of claim 1, wherein the reception module comprises:
    a wireless receiver for receiving a wireless signal from the base station or the adjacent terminal;
    an analog-to-digital converter (ADC) for receiving an analog signal from the wireless receiver, converting the received analog signal into a digital signal, and outputting the digital signal; and
    a demodulator for demodulating the digital signal output from the ADC,
    wherein the wireless receiver comprises:
    a downlink signal receiver for receiving the downlink signal from the base station; and
    a P2P signal receiver for receiving the P2P signal from the adjacent terminal, and
    the demodulator comprises:
    a downlink signal demodulator for demodulating the downlink signal from the base station; and
    a P2P signal demodulator for demodulating the P2P signal from the adjacent terminal.

3. The terminal of claim 2, further comprising a self-interference eliminator for eliminating the influence of interference caused by a transmission signal from the received signal input to the demodulator.

* * * * *